Jan. 3, 1950 G. T. RANDOL 2,493,030
VEHICLE POWER DRIVE CONTROL SYSTEM
Filed Feb. 21, 1944 3 Sheets-Sheet 1
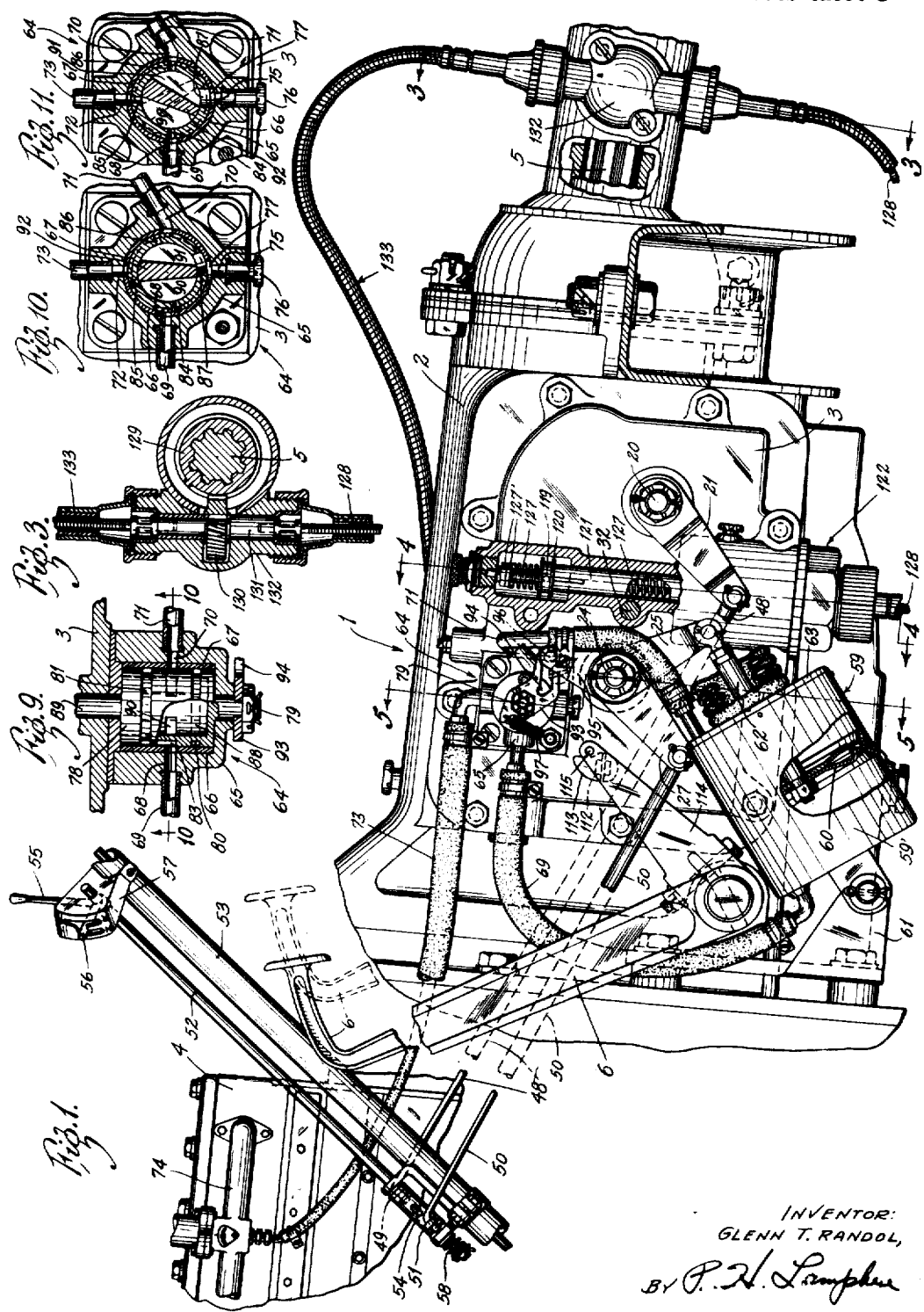
INVENTOR:
GLENN T. RANDOL,
BY P. H. Lamphere
ATTORNEY.

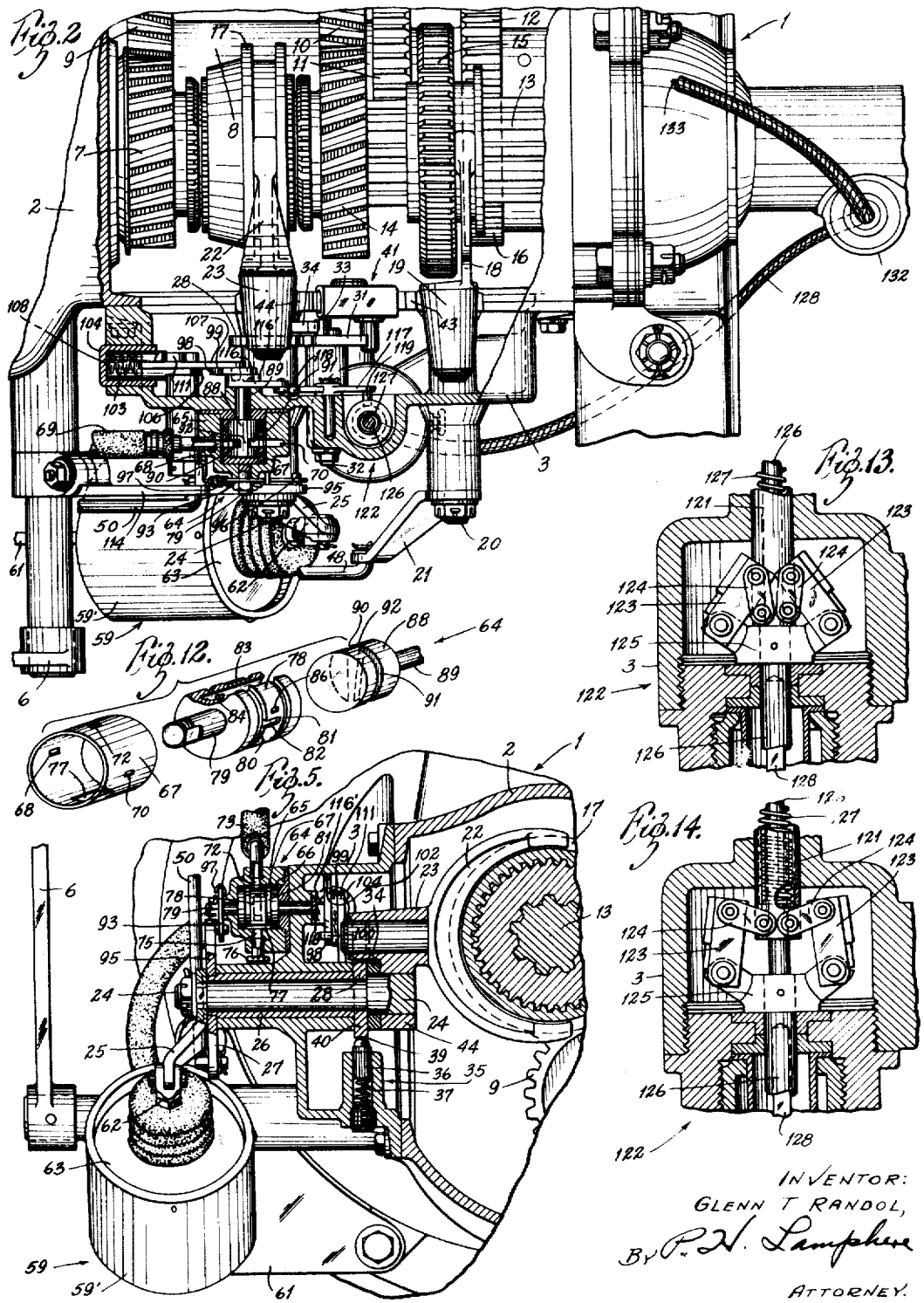

Jan. 3, 1950     G. T. RANDOL     2,493,030
VEHICLE POWER DRIVE CONTROL SYSTEM
Filed Feb. 21, 1944     3 Sheets-Sheet 3
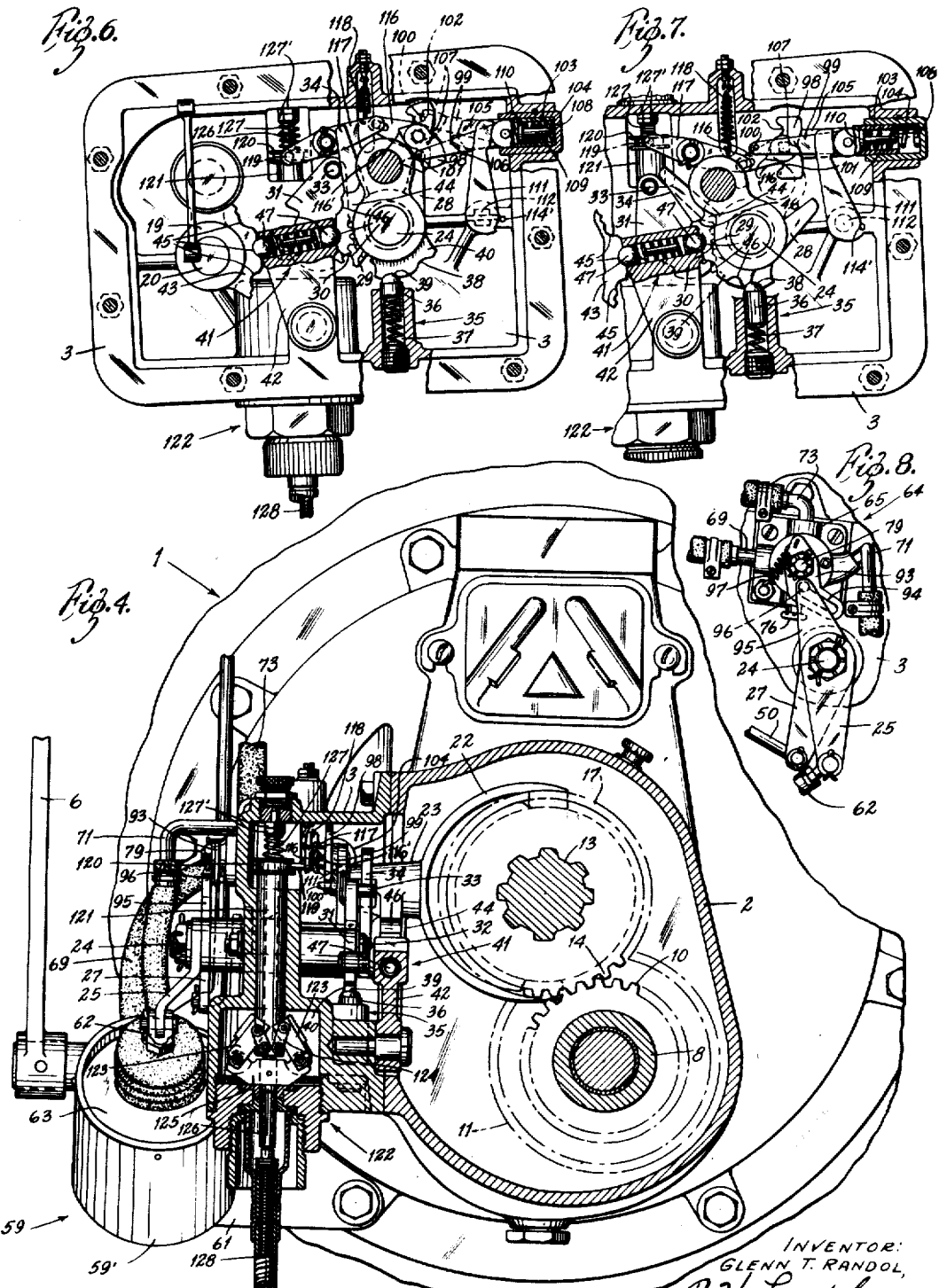
INVENTOR:
GLENN T. RANDOL,
ATTORNEY.

Patented Jan. 3, 1950

2,493,030

UNITED STATES PATENT OFFICE 2,493,030

VEHICLE POWER DRIVE CONTROL SYSTEM

Glenn T. Randol, St. Louis, Mo.

Application February 21, 1944, Serial No. 523,240

20 Claims. (Cl. 74—336.5)

My invention relates generally to change-speed power drive systems for motor vehicles, and more particularly to improved control means for changing the speeds thereof. The present control means is in the nature of an improvement on the control means shown in my U. S. Patents Re. 22,791 and 2,386,174.

One of the objects of my invention is to provide improved power-operated means for establishing certain speed ratio gear sets of a change speed gearing and to associate therewith means responsive to the speed of the driven shaft for determining which gear ratio will be established by the power-operated means.

Another object of my invention is to embody improved control valve means in a fluid pressure operated gear ratio establishing means which will have associated therewith a speed responsive device for determining the manner in which an operator-operated member controls said valve means so as to cause the establishment of the gear ratios.

Still another object of my invention is to so construct the control valve means that one operator-operated member conditions the valve means for operation by controlling an element thereof and another operator-operated member controls another element thereof to either of two positions so as to cause fluid pressure to be effective to establish selectively either of two gear ratios, the position of said other element and the gear ratio established being determinable by the condition of a speed responsive device.

Yet another object of my invention is to provide an improved power-operated control means for a motor vehicle change speed gearing which will permit the establishment of different gear ratios only when the speed of the vehicle is within predetermined ranges and to so combine and associate the parts thereof that a simple and compact unit is obtainable for ready installation on existing motor vehicles without necessitating alterations of the standard change speed gearing thereof.

Other objects of my invention will become apparent from the following description taken in connection with the accompanying drawings in which Figure 1 is a side view, parts being shown in section, of a change speed gearing and other parts of a motor vehicle having associated therewith control means embodying my invention, the gearing and control means being in their neutral positions and the clutch pedal in the clutch disengaged position;

Figure 2 is a top view of a portion of the control means and the change speed gearing, some parts being shown in section and the gearing housing being broken away to show the gearing arrangement;

Figure 3 is a sectional view taken on the line 3—3 of Figure 1 showing the power take-off arrangement for driving the speed responsive device;

Figure 4 is a sectional view taken on the line 4—4 of Figure 1 showing details of the speed responsive device;

Figure 5 is a sectional view taken on the line 5—5 of Figure 1 showing the control valve and some of the control parts therefor;

Figure 6 is a view of the inside of the cover plate for the gearing casing showing the parts mounted thereon, said parts being in the positions corresponding to neutral condition of the gearing;

Figure 7 is a view of a portion of the structure shown in Figure 6 with the parts shown being positioned to correspond to second speed of the gearing;

Figure 8 is an external view of the control valve and the hand-operated control parts therefor, said valve and parts being shown in positions corresponding to the "H" (second and high) setting of the hand lever;

Figure 9 is a combined sectional and broken away view of the control valve showing details thereof;

Figure 10 is a sectional view taken on the line 10—10 of Figure 9 showing the control valve in its shut off position as determined by the hand lever;

Figure 11 is a view similar to Figure 10 showing the valve elements in the positions corresponding to second gear ratio;

Figure 12 is a perspective view showing the two movable elements of the control valve and the sleeve within which they are positioned;

Figure 13 is a view of the speed responsive control device with the parts in the positions assumed when the vehicle is at rest; and Figure 14 is a view similar to Figure 13 but showing the parts of the speed responsive device in the positions assumed when the vehicle is traveling at such speed that high speed can be established.

Referring to the drawings in detail and first to Figures 1 and 2, there is disclosed a change speed gearing generally indicated by the numeral 1 with which my improved control mechanism is associated, this transmission being enclosed in a casing 2 provided with a cover plate 3 and situated between the usual engine 4 of the vehicle and the usual propeller shaft 5. Between the engine and the change speed gearing is the usual main friction clutch mechanism (not shown) which is employed to disconnect the transmission of the power from the engine to the gearing for any desired purpose including the facilitating of gear ratio changing. This main friction clutch is controlled by the clutch pedal 6.

The particular change speed gearing employed is one having three forward speed ratio gear sets and a reverse gear set. The gearing arrangement is shown in Figure 2 and comprises a combined driving shaft and gear 7 which is connected through the main clutch so as to be driven by the crankshaft of the engine. The gear 7 constantly drives a countershaft 8 which carries gears 9, 10, 11 and 12, gear 9 being in constant mesh with gear 7. Axially aligned with the combined driving shaft and gear 7 is a driven shaft 13 connected to propeller shaft 5 and having rotatably mounted thereon a gear 14 constantly meshing with gear 10 of the countershaft to thereby provide the second gear ratio. The driven shaft 13 has splined thereon a combined low and reverse gear 15 which is adapted to be engaged with an idler gear 16 constantly meshing with gear 12 on the countershaft to thus provide the reverse gear ratio or engaged with countershaft gear 11 to provide low speed ratio. Also splined on the driven shaft is a double clutch element 17 which is positioned between gears 7 and 14 and is employed to selectively connect either gear 14 to the driven shaft or the driven shaft directly to the combined driving shaft and gear 7 so as to provide a direct drive.

Referring now to Figures 1, 2, 4, 5 and 6, the combined low and reverse gear 15 is controlled by a shifting fork 18 which is pivotally mounted in arm 19 secured to the inner end of a shaft 20 journaled in the rear end of the gearing casing cover 3. The outer end of this shaft carries an arm 21 whereby the shaft may be rotated to thus cause the shifting fork 18 and gear 15 to be shifted in opposite directions from the neutral or central position shown in Figure 2 to thereby obtain low or reverse gear ratios. The double clutch element 17 is controlled by a shifting fork 22 which is pivotally mounted in an arm 23 secured to the inner end of a shaft 24 journaled in the forward end of the casing cover 3. The outer end of this shaft has secured thereto an arm 25 for rotating the shaft to thereby move the shifting fork 22 and the double clutch element 17 in either direction from neutral position, as shown in Figure 2, and thereby establish the second speed ratio or the high (direct) speed ratio.

The shaft 24 is surrounded by a rotatable sleeve 26 which also acts as a bearing sleeve for the shaft. The outer end of this sleeve has mounted thereon a double arm lever 27. The inner end of this sleeve carries an integral arm 28 which extends upwardly along side arm 23 in which shifting fork 22 is pivotally mounted. The arm 28 is provided with gear teeth 29 which are adapted to mesh with teeth 30 on an arm 31 pivotally mounted on a shaft 32 carried by the cover plate, said latter arm having a pin 33 projecting from its upper end. Between arm 28 of sleeve 26 and arm 23, in which the shifting fork 23 is pivoted, there is loosely mounted upon the shaft 24, an arm 34 which also extends upwardly along side arm 23 but on the opposite side thereof from arm 28. This arm is arranged to be engaged by the pin 33 carried by the previously referred to arm 31 which is geared to arm 28. By means of this arrangement it is seen that arm 28 can be rotated by the sleeve 26 and when said arm 28 is given a clockwise rotation, as viewed in Figure 6, it will move away from the shifting fork carrying arm 23 and also cause a rotation of arm 31 by the gear connection so that pin 33 will be moved away from arm 34. The arms 28 and 31 then assume the positions shown in Figure 7. Under these conditions it is seen that the shifting fork carrying arm 23 is free so that it can be rotated in either direction from its position shown in Figure 6 to thus shift the double clutch element 17 to its operative positions. The arm 34 will not restrain any movement of the shifting fork carrying arm 23 when the arm 23 is rotated to the left to obtain second speed ratio since said arm 34 is freely mounted on shaft 24. If the double clutch element 17 should be in either of its operative positions with arms 28 and 34 spread apart due to a rotation of sleeve 26, then the double clutch element can be brought back to its neutral or central position merely by a reverse rotation of sleeve 26. Figure 7 shows the two arms 28 and 34 spread apart and the gear shifting fork arm in the position where second speed ratio is active. When sleeve 26 and arm 28 are given a counterclockwise rotation, as viewed in Figure 7, arm 28 will move to the position shown in Figure 6 and the gear connection with arm 31 will cause pin 33 in the arm to pick up arm 34 and move it to the position shown in Figure 6, thus bringing the shifting fork 22 and the double clutch element to neutral position. If the double clutch element should be in high speed ratio position (shown by the dotted line position of arm 23 in Figure 7), then arm 28 will pick up the shifting fork arm and cause the double clutch element to assume neutral position. In connection with the spread apart positions of arms 28 and 31, it is to be noted that these arms are allowed a certain amount of free movement toward each other before the shifting fork carrying arm 23 is picked up. The purpose of this will become apparent later in connection with the operation of the mechanism.

The two positions of sleeve 26 and integral arm 28 are determined by a detent 35 (Figures 5, 6 and 7) carried by the cover plate. This detent comprises a spring-pressed plunger 36 carried in a bore 37 in the cover plate and cooperating with two notches 38 and 39 in a flange 40 of lever 28.

The arms 19 and 23 in which the two gear shifting forks are pivotally mounted have associated therewith a combined detent and interlocking means generally indicated by the numeral 41 and shown in Figures 6 and 7. This interlocking means comprises a member 42 pivotally mounted on the backing plate and cooperating with flanges 43 and 44 on arms 19 and 20, respectively. Flange 43 has three notches 45 and flange 44 has three notches 46 with which cooperate spring-pressed balls 47 carried by arm 42. This combined interlocking and detent means is of well-known construction being in present commercial use and is not believed to require any further detailed explanation. The sole purpose is to prevent either gear shifting fork carrying arm 19 or 23 from being operated from neutral position when the other is in a gear ratio establishing position and to also yieldably hold both gear shifting fork carrying arms in their different neutral and operative positions.

Referring again to Figure 1, arm 21 on the external end of shaft 20 and arm 27 secured to the outer end of sleeve 26 are adapted to be manually controlled by a single hand lever which is mounted on the steering column just below the steering wheel. The arm 21 is connected by a rod 48 to an arm 49 and arm 27 is connected by a rod 50 to an arm 51. These arms 49 and 51 are mounted on the lower end of a shaft 52 journaled at its lower and upper ends on the vehicle steering column 53. The lower end of shaft 52 carries a pin 54 for engagement with suitable slots in the hubs of arms 49 and 51 whereby the shaft can be selectively connected to arm 49 or arm 51 by a longitudinal movement. The upper end of shaft 52 has secured thereto a hand lever 55 which has associated therewith a pointer 56 for cooperation with an h-slot in a bracket 57 secured to the steering column and also acting as the journaling means for the upper end of shaft 52. At the lower end of shaft 52 there is provided a spring 58 which normally biases shaft 52 downwardly so as to connect pin 54 with the slot in arm 41. Under these conditions the pointer 56 will be at the open end of the leg portion marked "H" of the h-slot. When the lever is moved to the closed end of the slot, it will be in the "high" setting position whereby either of the two high speed ratios, that is, second and direct speed ratios, may be obtainable. The movement of the hand lever will, by the connection present, cause arm 27 to be rotated in a counter-clockwise direction, as viewed in Figure 1, thereby rotating sleeve 26 so as to move arm 28 and arm 31, which is geared thereto, to the positions shown in Figure 7, thus permitting free movement of arm 23 which has pivoted thereto the shifting fork 22 for the double clutch element 17.

If the hand lever 55 and shaft 52 should be raised so that the pin in engaged in the slot of arm 49, the pointer 56 will be opposite the "R" and "L" portions of the h-slot so that the ow and reverse gear ratios may be obtained. When the hand lever is moved so that the pointer enters the "R" portion of the h-slot, then by means of the connection present the combined low and reverse gear 15 will be moved to engage with the idler gear 16 and establish reverse gear ratio. When the hand lever is moved so that the pointer enters into the "L" portion of the slot, then by means of the connection present, gear 15 will be moved forwardly, as viewed in Figure 2, and the low gear ratio established.

The lever 25 on the exterior of shaft 24 which actuates the shifting fork 22 for the double clutch element 17 is arranged to be power operated and to accomplish this there is provided power-operated means shown for example as a power cylinder or suction motor 59 comprising a cylinder 59' and a piston 60. The cylinder is pivotally mounted at one end to a bracket 61 and the piston is connected by a piston rod 62 to lever 25. The end of the cylinder through which the piston rod extends is closed by an end member 63. When the piston is in its central position, as shown in Figure 1, the double clutch element 17 will be in its neutral or central position, as shown in Figure 2.

The operation of the power cylinder is controlled by a control valve means 64 mounted on the exterior of the cover plate, this valve being shown in detail in Figures 9, 10, 11, and 12. The valve means comprises a casing 65 secured to the exterior surface of the cover plate and provided with a bore 66 within which is press-fitted a sleeve 67. A passage 68 extends through the forward side of the casing and sleeve and to this passage is connected a conduit 69 which is employed to connect the interior of the sleeve with the forward end of cylinder 59 of the power cylinder. Another passage 70 extends through the rear side of the casing and sleeve and to this passage is connected a conduit 71 for placing the interior of the sleeve in communication with the rear end of cylinder 59 of the power cylinder. The inner ends of passages 68 and 70 are diametrically arranged with respect to the interior of the sleeve. A third passage 72 extends through the casing and the sleeve on the upper side thereof and to this passage is connected a conduit 73 which leads to the manifold 74 of the engine 4. There is also provided a fourth passage 75 on the lower side of the casing and diametrically opposite passage 72, said passage 75 being connected to atmosphere through a filter element 76. As best seen in Figure 12, sleeve 67 is provided with an elongated slot 77 with which the passage 75 communicates.

Mounted for rotary movement within sleeve 67 is a cylindrical valve element 78 having an integral shaft portion 79 extending to the exterior of the valve casing whereby the valve element may be rotated. This valve element, on its exterior surface, is provided with two axially spaced annular grooves 80 and 81. Groove 80 communicates with an axially extending groove 82 and groove 81 communicates with an axially extending groove 83 (see Figures 9 and 12), these axially extending grooves being diametrically positioned. Both grooves 80 and 81 are so spaced as to communicate with the ends of slot 77 in sleeve 67 so that said grooves will at all times be in communication with the atmosphere through passage 75. The valve element 78 is also provided with four holes 84, 85, 86, and 87, the latter of which is larger than the others. These holes are circumferentially spaced apart 90 degrees so that in one position of the valve element the holes 84, 85 and 86 will simultaneously communicate with passages 68, 72, and 70, respectively, all as indicated in Figure 11. Under these conditions the larger hole 87 will also be in direct alignment with the slot 77 in sleeve 67. When the valve element, however, is turned in a clockwise direction from the position shown in Figure 11 to the position shown in Figure 10, the holes 84, 85, and 86 will no longer communicate with passages 68, 72, and 70, thus cutting off all communications between said passages and the interior of the valve element through the holes. Under these conditions the larger passage 87, however, will still remain in partial relation with slot 77 as clearly shown in Figure 10. When the valve element assumes the position shown in Figure 10, the axial grooves 82 and 83 will communicate with passages 70 and 68, respectively, to place these passages in communication with atmosphere.

Within the cylindrical valve element 78 is a piston valve element 88 having a control shaft 89 which extends into the interior of the cover plate. This piston valve element is provided with opposed slots 90 and 91 which are cut into the valve element from opposite sides thereof leaving a connecting web 92 which is somewhat frusto-conical in shape as viewed in section (Figures 10 and 11). By means of this piston valve element it is possible to employ the slots for placing the holes 85 and 87 in the cylindrical valve element 78 selectively in communication with hole 84 or hole 86 in said cylindrical valve element.

When slot 90, for example, is connecting holes 83 and 84, slot 91 will connect holes 86 and 87 and when slot 91 is connecting holes 85 and 86, slot 90 will be connecting holes 84 and 87. Thus it is seen that with this arrangement the manifold can be connected selectively to either end of the cylinder of the power cylinder and when the manifold is in communication with one end of the cylinder the other end of the cylinder will be in communication with atmosphere since hole 87 communicates with passage 55.

The shaft 79 of valve element 78 which extends to the exterior of the valve casing has secured thereto an arm 93 which is provided with a slot 94 having a long straight portion and a short angular portion as clearly shown in Figures 1 and 8. This lever is arranged to be actuated by the previously mentioned lever 27 which is connected to the outer end of sleeve 26 and is actuated by the hand lever 55. The connection is made by means of an extension 95 on lever 27 which carries a pin 96 for cooperation with slot 94. A spring 97 is connected to the slotted arm 93 and tends to rotate the arm and the valve element 78 in an anti-clockwise direction as viewed in Figures 1 and 8. By means of the connection between lever 27 and the valve element 78 the valve element can be manually controlled by the hand lever 55 to thereby set said valve element in its two positions shown in Figures 10 and 11, Figure 10 corresponding to the position of arm 93 as shown in Figure 1 and Figure 11 corresponding to the position of arm 93 shown in Figure 8.

The shaft 89 of the piston valve element which extends into the interior of the casing cover 3 has secured thereto a double arm lever 98, best shown in Figures 6 and 7, whereby said valve element may be rotated to its various positions. This double arm lever is adapted to be actuated by a link 99 which is provided with a pin 100 for engaging in notches 101 and 102 in oppositely extending arms of lever 98. The link 99 is pivotally connected at one end to a reciprocating plunger 103 which is mounted in a cup-shaped member 104 carried by the forward end flange of the cover plate. The plunger is also provided with an integral extension 105 which is provided with a V-shaped end 106 for cooperation with a V-shaped notch 107 in the central part of the double arm lever 98. The plunger is backed by a spring 108 which tends to push the plunger inwardly and cause the V-shaped end of extension 105 to engage in notch 107 to thus centralize the double arm lever and thereby place the piston valve element 88 in its central position as shown in Figure 10. The spring 108 also acts on a headed pin 109 which is adapted to cooperate with a flat surface 110 on the pivoted end of link 99 to thus cause the link to be yieldably held in alignment with the axis of the plunger but does not prevent the link from pivoting out of alignment when caused to do so by a force on its free end. The plunger 103 and all the elements carried thereby are adapted to be actuated by an arm 111 which is pivoted on the inner end of a short shaft 112 journaled in the forward end of the cover plate. The exterior end of this shaft has secured thereto a short arm 113 which is adapted to be actuated by means of an arm 114 secured to the hub of the clutch pedal 6, said arm having on its outer end a pin 115 for engaging the arm 113. When the clutch pedal is depressed, arm 113 will be actuated, the actuation of arm 113, however, not taking place until the clutch pedal has been moved sufficiently to just disengage the main clutch. When arm 113 is moved, it will rotate arm 111 on the interior of the casing, thereby pushing the plunger 103 forwardly and causing it to rotate the double arm lever 98. A stop pin 114' is employed to limit the anti-clockwise rotation of the arm 111 as viewed in Figures 6 and 7.

On the inner end of shaft 89 of the piston valve element 88 is rotatably mounted an arm 116 which is positioned between the double arm lever 98 and the cover plate. This arm carries a V-shaped portion 116' which is employed for selectively guiding the pin 100 on link 99 to the notches 101 and 102 so that the link can actuate the double arm lever and rotate the piston valve element to either of its two positions depending upon which arm is connected to link 99. The outer end of the arm 115 is pivotally connected to a lever 117 which is pivoted intermediate its ends on the cover plate. These levers are acted upon by a spring 118 which normally biases the arm 115 and lever 117 upwardly as shown in Figure 6. The lever 117 carries a pin 119 engaging in a grooved collar 120 carried by an actuating sleeve 121 of a speed responsive device generally indicated by the numeral 122 and mounted in the cover plate.

The speed responsive device is best shown in Figures 1, 4, 13, and 14. The actuating sleeve of the speed responsive device has connected to its lower end two centrifuge members 123, said connection being made through links 124. These centrifuge members are pivoted on a collar 125 secured to a shaft 126 which extends upwardly through the actuating sleeve 121. The sleeve is normally biased downwardly by a spring 127 which surrounds the shaft 126 and acts on the lower end of sleeve 121 (see Figure 14). The force of the spring can be varied by means of adjusting nuts 127' on the top of shaft 126. The spring 127 also is aided by previously mentioned spring 18 in tending to keep the centrifuge members in their inward positions as shown in Figure 14. The shaft 126 is connected to be driven by a flexible cable 128 leading from a power take-off arrangement on the propeller shaft 5 of the gearing. This power take-off device is a part of the usual vehicle speedometer driving means which comprises a gear 129 secured to the propeller shaft and meshing with a gear 130 journaled by a shaft 131 in a casing 132 attached to the propeller shaft housing. The shaft 132 is connected at one end to cable 128 and at its other end to the speedometer driving flexible cable 133. It is thus seen that the driving of the speed responsive device is accomplished in a simple manner by employing the power take-off mechanism already associated with the propeller shaft.

Operation

Referring to the operation of my improved control means, the parts will be in the positions shown in Figures 1, 2, 4, 5, 6, 9, 10, and 13 when the change speed gearing is in neutral condition and the clutch pedal is moved beyond clutch-disengaging position. Under these conditions if it is desired to establish either low or reverse gear ratio, the hand lever 55 need only be raised upwardly and then rotated to place the pointer in either end of the H-slot "R" or "L." If it is placed in the "R" end of this slot, the reverse speed ratio will be established by operator effort. The gear 15 will be shifted rearwardly, as viewed in Figure 2, to a meshed condition with the idler gear 16. If the pointer is placed at the "L" end of the H-slot, gear 15 will be shifted by operator effort forwardly to mesh with the countershaft gear 11 to thereby establish low speed ratio. When either the low or reverse speed ratio is established, release of the clutch pedal will permit power from the engine to be transmitted to the wheels of the vehicle and the vehicle moved in the desired direction. When the low and reverse speed ratios are being established or are operative, the manifold of the engine will be cut off at all times from the power cylinder by the condition of the valve element 78 of control valve means 64 which will be in the position shrown in Figure 10. When the valve element 78 is in cut-off position, both ends of the cylinder of the power cylinder will be in communication with atmosphere. The movement of the clutch pedal to positions beyond clutch-disengaged position may cause movement of the piston element 88 but such will not change the shut-off condition of the valve means since this is controlled by the cylindrical valve element 78. In Figure 6, for example, the parts controlled by the clutch pedal are shown in positions corresponding to the movement of the clutch pedal beyond clutch-disengaged position and the piston valve element moved to the position corresponding to the full line position shown in Figure 11 but such position will not affect the shut-off condition of the control valve means.

When the clutch pedal is moved beyond clutch-disengaged position and it is desired to obtain second speed ratio, this can be accomplished by merely moving lever 55 so that the pointer is in the end of the portion of the H-slot marked "H." Under such conditions, arm 27 and sleeve 26 will be rotated in a clockwise direction, as viewed in Figure 1. Consequently, arm 28 will be moved away from the gear shifting fork carrying arm 23, thereby moving arm 31 also away from arm 23. These positions are shown in Figure 7. The rotation of arm 27 will also cause the extension 95 thereon to move its pin 96 in slot 94 of the valve controlling arm 93. This pin will eventually be forced up into the short angle portion of said slot to thereby cause arm 93 to be rotated to the position shown in Figure 8. This will rotate the cylindrical valve element to the position shown in Figure 11 and thereby condition it so that either end of the power cylinder can be connected to the suction motor. In other words, the control valve means is no longer in its shut-off condition. The cylindrical valve element is caused to be moved due to the pin and slot arrangement only during the last small movement of lever 55 when the pointer is moved into the "H" position. Since the clutch pedal has been moved beyond clutch-disengaged position, the piston valve element will be caused to be positioned as shown in Figure 11. This is brought about by the movement of link 99 and the simultaneous actuation of the double arm lever 38 which controls the piston valve element (see Figure 6). The piston valve element, however, will assume the position shown in Figure 11 only if the speed of the vehicle is below a predetermined rate which will be determined by the speed responsive device. This predetermined rate is arranged to be at around twenty miles per hour vehicle speed. In other words, when the actuating sleeve 121 of the speed responsive device is in its lower position (Figure 13), the piston valve element will be positioned as shown in Figure 11 since, under such conditions, the actuating sleeve will cause the V-shaped portion of arm 116 to be in a position to guide the pin 100 on link 99 downwardly to engage in notch 101 of the double arm lever (see Figure 6) and rotate the piston valve element to the position shown in Figure 11. If the speed of the vehicle should be above twenty miles per hour, the centrifuge members will so act on the actuating sleeve 121 and move it upwardly, as shown in Figure 14, that arm 116 carrying the V-shaped portion 116' will be in such position that the pin 100 on link 99 will be guided into notch 102 of the double arm lever 98 (shown by dashed lines in Figure 6) and rotate the piston valve element to the position shown in dotted lines in Figure 11. The twenty miles per hour vehicle speed controlling the dividing line between the obtaining of the second and high speed ratios is the point at which the apex 116' of the V-shaped portion of lever 116 is substantially at the axis of link 99 when in its normally released position as viewed in Figure 7.

If it is considered that the vehicle is traveling below twenty miles per hour at the time it is desired to shift from low speed ratio, then the piston valve element will be in the position shown in Figure 11. Thus when hand lever 55 is moved so that the pointer is in the "H" position, the forward end of the power cylinder will be immediately connected to the manifold whenever the pointer reaches its "H" position since then the cylindrical valve element will be moved from the position shown in Figure 10 to that shown in Figure 11. Consequently, this will cause a movement of the piston of the power cylinder to the forward end of the cylinder, thereby shifting the double clutch element 17 of the gearing rearwardly to connect the second speed ratio gear 14 to the driven shaft. Release of the clutch pedal will now result in the vehicle being moved forwardly in second speed ratio. When the clutch pedal is released, plunger 103 will also be released and spring 108 will move link 99 to the position shown in Figure 7. The piston valve element 88 will thereby be returned to its central position shown in Figure 10 by the action of the V-shaped end 106 on extension 105 engaging in notch 107 of the double arm lever 98. If the clutch pedal should be disengaged at any time when the vehicle is traveling below twenty miles per hour, there will be no additional shifting of the gearing since all that will happen is that the forward end of the power cylinder will be re-connected to the manifold. Since the piston is already in the forward end of the cylinder of the power cylinder, no movement thereof will result.

If second speed ratio has been established and the vehicle is moving at a rate greater than twenty miles per hour, direct drive ratio may be obtained by merely moving the clutch pedal beyond clutch-disengaged position, as shown in Figure 1. The vehicle speed has now resulted in the speed responsive device moving the actuating sleeve 121 upwardly to the position shown in Figure 14. As a result thereof, arm 116 will assume the position shown in Figure 7 wherein the apex of the V-shaped portion 116' is in such position as to guide pin 100 into notch 102 of the double arm lever when the clutch pedal is disengaged and the link 99 moved forwardly. This will now cause the double arm lever 98 to assume the position shown in dashed lines in Figure 6 and result in the rotation of the piston valve element 88 to the position shown in dashed lines in Figure 11. The forward end of the cylinder of the power cylinder will thereby be connected to the manifold and the rear end of said cylinder connected to atmosphere. Consequently, piston 60 will be moved to the rear end of the cylinder and the double clutch element 17 shifted forwardly, as viewed in Figure 2, to directly connect the driving shaft and gear 7 with the driven shaft. When the clutch pedal is released to re-engage the clutch, the piston valve element will be returned to the central position, as shown in Figure 10.

When high speed ratio is established, it will be maintained as long as the vehicle speed is above twenty miles per hour and notwithstanding a movement of the clutch pedal to a position beyond clutch-disengaged position. This movement of the clutch pedal only results in the rear end of the cylinder of the power cylinder being re-connected to the manifold and since the piston is already at the rear end of the cylinder, it can be moved no further. However, if the vehicle speed should drop below the twenty miles per hour speed limit and the operator should desire to obtain second speed ratio, this can be done by merely depressing the clutch pedal to a position beyond clutch-disengaged position, whereupon arm 116 will assume the full line position shown in Figure 6. Consequently, the double arm lever will be rotated so as to move the piston valve element to the position shown in Figure 11 to connect the forward end of the cylinder of the power cylinder to the manifold and result in a shift of the double clutch element 17 to establish the second speed ratio in a manner already described. When the speed of the vehicle again goes above twenty miles per hour, high speed ratio may be established by merely moving the clutch pedal to a position beyond clutch-disengaged position.

If the vehicle has been started in low speed and the speed of the vehicle at the time the pointer 56 is placed in the "H" end of the H-slot is above twenty miles per hour, high speed ratio will be immediately attained and second speed ratio skipped. Under these conditions the arm 116 will be in the position shown in Figure 6 so that the movement of the clutch pedal beyond clutch-disengaged position will cause pin 100 on link 99 to ride into notch 101 and position the piston valve element as shown in dashed lines in Figure 11. It makes no difference whether the hand lever 55 is moved after the clutch pedal is moved beyond clutch-disengaged position or after such clutch pedal movement. The result will be the establishment of the high speed or direct drive.

When the change speed gearing is in either high or second speed drive, it can be neutralized manually at any time by merely bringing the lever 55 to a position where the pointer is at the cross-slot of the h-slot. As the lever is moved and the pointer moves out of the "H" end of the h-slot, the initial movement will result in the cylindrical valve element 78 being returned to the position shown in Figure 10. This will connect both ends of the cylinder of the power cylinder to atmosphere and cut off communication with the manifold. Movement of the lever in returning the pointer to the cross-slot will also result in the rotation of sleeve 26 and movement of arms 28 and 31 toward each other. When the cylindrical valve element reaches the cut-off position, arms 28 and 31 will move sufficiently inwardly to then pick up and move the gear shifting fork carrying arm 23 regardless of whether it is in high or second speed operative position. Continued movement of lever 55 to where the pointer is at the cross-slot will then return the gear shifting fork 22 to its central position, thereby neutralizing the gearing. Along with the movement of the double clutch element 17 there will also be a movement of the piston of the power cylinder to the center of cylinder 59'. Free movement of the piston is permitted since both ends of the cylinder of the power cylinder are placed in communication with atmosphere prior to any movement of the piston taking place as a result of the movement of arms 28 and 31 toward each other. In connection with this neutralizing action, attention is called to Figure 7 wherein it is noted that when arms 31 and 28 are in their extreme spread-apart position, they have a certain amount of free movement toward each other before arm 28 can pick up the gear shifting fork carrying arm 23 when it is in high speed ratio position or before pin 33 on arm 31 can engage freely rotative arm 34 to pick up the fork carrying arm 23 when it is in second speed ratio position. During this "lost motion" movement of arms 28 and 31 toward each other, the cylindrical valve element 88 is being moved to the shut-off position shown in Figure 10, thereby placing both ends of the power cylinder in communication with atmosphere.

From the foregoing description it is seen that there has been devised a very simple and compact control means for a change speed gearing which will permit manual establishment of low and reverse gear ratios by manual effort and the establishment of either second or high speed drive by operation of a power means. As to whether second or high speed will be made operative is dependent upon the speed of the vehicle. The operator can obtain high or second speed only when these speeds are desirable. The shift to either second or high speed is made only under conditions where the speed of the vehicle dictates that such a speed is desirable and then the operator need not establish said speed until he wants it. This permits the operator to have control of the gear ratio changing at all times provided, of course, that the speed of the vehicle is such that the gear ratio to be established by the operator will be one which is desirable for that vehicle speed.

Being aware of the possibility of modifications in the particular structure herein illustrated and described without departing from the fundamental principles of my invention, I do not intend that its scope be limited except as set forth by the appended claims.

What I claim as new and desire to secure by Letters Patent of the United States is:

1. In control means for a change speed gearing having two different speed ratio gear sets, a toothed member movable to two different tooth engaging positions to establish the said gear speeds, an operator-operated control member having a reciprocal movement, means controlled by the control member for moving the movable member to its two positions and comprising a connection means movable by the control member and selecting means associated with the connection means for selectively establishing either of two connections from the control member so that the moving means can be caused to make operative either of the gear speeds by a movement of the control member to a predetermined position, and speed responsive means for determining the selecting condition of the selecting means.

2. In control means for a change speed gearing having two different speed ratio gear sets, a toothed member movable to two different tooth engaging positions to establish the said gear speeds, means for moving said member to its two positions including power means having a reciprocable member, operator-operated control means and an element connected to be moved thereby to two positions, selecting means for determining to which position the element will be moved by reciprocable member of the power means, when operated, and speed responsive means for controlling the selecting condition of the selecting means.

3. In control means for a change speed gearing having two different speed ratio gear sets, a toothed member movab'e to two different tooth engaging positions to establish the said gear speeds, means for moving said member to its two positions including an operator-operated control member and an element connected to be moved thereby to two positions, selecting means for determining to which position the element will be moved by the control member when operated, speed responsive means for controlling the selecting condition of the selecting means, and means for disabling the moving means at will.

4. In control means for a change speed gearing having two different speed ratio gear sets, a toothed member movable to two different tooth engaging positions to establish the said gear speeds, means for moving said member to its two positions including an operator-operated control member and an element connected to be moved thereby to two positions, selecting means for determining to which position the element will be moved by the control member when operated, speed responsive means for controlling the selecting condition of the selecting means, means for disabling the moving means, a second operator-operated member for controlling the disabling means, and means operable by the second operator-operated member when moved to the disabling position for neutralizing either speed gear, if established, by operator effort.

5. In control means for a change speed gearing having two different speed gear sets, a member movable to two different positions for establishing the said gear speeds, means including fluid pressure operated means for moving the movable member to its two different positions including a control valve means having an element movable to two different positions to cause the said means to operate, an operator-operated member, a control connection between the last member and the element of the control means including selecting means for determining to which position the element of the valve means will be moved when the operator-operated member is moved to a predetermined position, and speed responsive means for controlling the selecting condition of the selecting means.

6. In control means for a change speed gearing having two different speed gear sets, a single toothed member movable to two different tooth engaging positions for establishing the said gear speeds, means for moving the movable member to its two different positions including a control means having an element movable to two different positions to cause the means to operate, an operator-operated member, a control connection between the last member and the element of the control means including selecting means for determining to which position the element will be moved when the operator-operated member is moved to a predetermined position, speed responsive means for controlling the selecting condition of the selecting means, and means comprising a second operator-operated member for controlling the operativeness of the element of the control means.

7. In control means for a change speed gearing having two different speed gear sets, a member movable to two different positions for establishing the said gear speeds, power means for moving the movable member to its two different positions including a control means having an element movable to two different positions to cause the power means to operate, an operator-operated member, a control connection between the last member and the element of the control means including selecting means for determining to which position the element will be moved when the operator-operated member is moved to a predetermined position, speed responsive means for controlling the selecting condition of the selecting means, means comprising a second operator-operated member for controlling the operativeness of the control means, and other means controlled by th second operator-operated member for neutralizing a speed gear, if established, by operator effort when the control means is made inoperative.

8. In control means for a change speed gearing having two different speed gear sets, motor power means having a movable member connected to establish the said gear speeds by a movement in opposite directions, control means for the power means comprising an element movable to two positions to cause the movable member of the power means to move to its two gear speed establishing positions, an operator-operated member, a connection between said operator-operated member and the control means including a selecting means for determining to which position the element of the control means will be moved when the operator-operated member is operated, and speed responsive means for controlling the selecting condition of the selecting means.

9. In control means for a change speed gearing having two different speed gear sets, motor power means having a movable member connected to establish the gear speeds by a movment in opposite directions, control means for the power means comprising an element movable to two positions to cause the movable member of the power means to move to its two gear speed establishing positions, an operator-operated member, a connection between said operator-operated member and the control means including a selecting means for determining to which position the element of the control means will be moved when the operator-operated member is operated, speed responsive means for controlling the selecting condition of the selecting means, and means for disabling the control means at will so that operation of the operator-operated member will be ineffective to establish a speed gear.

10. In control means for a change speed gearing having two different speed gear sets, motor power means having a movable member connected to establish the said gear speeds by a movement in opposite directions, control means for the power means comprising an element movable to two positions to cause the movable member of the power means to move to its two gear speed establishing positions, an operator-operated member, a connection between said operator-operated member and the control means including a selecting means for determining to which position the element of the control means will be moved when the operator-operated member is operated, speed responsive means for controlling the selecting condition of the selecting means, and means operable at will for disabling the control means and for subsequently neutralizing a gear speed by operator effort.

11. In control means for a change speed gearing having two different speed gear sets, motor power means having a movable member connected to establish the said gear speeds by a movement in opposite directions, control means for the power means comprising an element movable to two positions to cause the movable member of the power means to move to its two gear speed establishing positions, an operator-operated member, a connection between said operator-operated member and the control means including a selecting means for determining to which position the element of the control means will be moved when the operator-operated member is operated, speed responsive means for determining the selecting condition of the selecting means, a second operator-operated member, and means operable by said second operator-operated member when moved from one position to another for first disabling the power means and then neutralizing a speed gear if established.

12. In control means for a change speed gearing having two different speed gear sets, a fluid motor having a movable member connected to establish either speed gear by a movement in opposite directions, a source of fluid pressure different from atmosphere, means comprising control valve means having a movable element movable to two positions for alternately connecting opposite sides of the movable member of the motor to the source, a control member, a connection between the control member and the valve element, selecting means associated with the connection for determining to which position the valve element will be moved by the control member when moved, and speed responsive means for controlling the selecting condition of the selecting means.

13. In control means for a vehicle change speed gearing having two different speed gear sets for driving a driven member, a fluid motor having a movable member connected to establish either speed gear by a movement in opposite directions, a source of fluid pressure different from atmosphere, means comprising control valve means having a movable element movable to two positions for alternately connecting opposite sides of the movable member of the motor to the source, a pedal, a connection between the pedal and the valve element, selecting means associated with the connection for determining to which position the valve element will be moved by the pedal when it is moved to a predetermined position, and means responsive to the speed of the driven member of the gearing for controlling the selecting condition of the selecting means.

14. In control means for a change speed gearing having two different speed ratio gear sets, a fluid motor having a movable element connected to establish either speed gear by a movement in opposite directions, a source of fluid pressure different from atmospheric pressure, control valve means for the motor comprising a casing connected to the source, the opposite ends of the motor and through a single port to the atmosphere, a rotatable cylindrical valve element having a position for cutting off the source from communication with both ends of the motor and for placing said ends in communication with the atmospheric port and a second operative position for placing the source, both ends of the motor and the atmospheric port in communication with its interior and a second rotatable valve element within the cylindrical valve element for selectively connecting the source with the ends of the motor and, reversely, the ends of the motor with the atmospheric port, an operator-operated member for controlling the cylindrical valve element, and means for controlling the second valve element to cause a speed gear change when said cylindrical valve element is operated as aforesaid to its second operative position.

15. In control means for a change speed gearing having two different speed ratio gear sets, a fluid motor having a movable element connected to establish either speed gear by a movement in opposite directions, a source of fluid pressure different from atmospheric pressure, control valve means for the motor comprising a casing connected to the source, the opposite ends of the motor and the atmosphere, a rotatable cylindrical valve element having a position for cutting off the source from communication with both ends of the motor and for placing said ends in communication with the atmosphere and a second operative position for placing the source, both ends of the motor and the atmosphere in communication with its interior and a second rotatable valve element within the cylindrical valve element for selectively connecting the source with the ends of the motor and, reversely, the ends of the motor with atmosphere, an operator-operated member movable from one position to another position for placing the cylindrical valve element in the operative position from the cut-off position, means operable by said operator-operated position when returned to said one position for placing the cylindrical valve element in the shut-off position and for neutralizing a speed gear, if established, by operator effort, and means for controlling the second valve element.

16. In control means for a change speed gearing having two different speed ratio gear sets, a fluid motor having a movable element connected to establish either speed gear by a movement in opposite directions, a source of fluid pressure different from atmospheric pressure, control valve means for the motor comprising a casing connected to the source, the opposite ends of the motor and the atmosphere, a rotatable cylindrical valve element having a position for cutting off the source from communication with both ends of the motor and for placing said ends in communication with the atmosphere and a second operative position for placing the source, both ends of the motor and the atmosphere in communication with its interior and a second rotatable valve element within the cylindrical valve element for selectively connecting the source with the ends of the motor and, reversely, the ends of the motor with atmosphere, an operator-operated member movable from one position to another position for placing the cylindrical valve element in the operative position from the cut-off position, means operable by said operator-operated position when returned to said one position for placing the cylindrical valve element in the shut-off position and for neutralizing the established speed gear by operator effort, means for controlling the second valve element at will, and speed responsive controlled means for determining to which selective position the second valve will be moved by its control means.

17. In control means for a change speed gearing having two different speed ratio gear sets, a fluid motor having a movable element connected to establish either speed gear by a movement in opposite directions, a source of fluid pressure different from atmospheric pressure, control valve means for the motor comprising a casing connected to the source, the opposite ends of the motor and the atmosphere, a rotatable cylindrical valve element having a position for cutting off the source from communication with both ends of the motor and for placing said ends in communication with the atmosphere and a second position for placing the source, both ends of the motor and the atmosphere in communication with its interior and a second rotatable valve element within the cylindrical valve element for selectively connecting the source with the ends of the motor and, reversely, the ends of the motor with atmosphere, an operator-operated member for controlling the cylindrical valve element, a second operator-operated member for controlling the second valve element, and speed responsive controlled means for determining to which position the second valve means will be moved by said second operator-operated member.

18. In control means for a change speed gearing having two different speed ratio gear sets, a toothed member movable to two different tooth engaging positions for establishing the two speed gears, fluid power means for moving said member, a source of fluid pressure to exert a force for operating said power means, a control valve element for said fluid power moving means and movable to two different operative positions, a member for moving said control valve element, a connecting means between the control element and the moving member comprising means for selectively establishing different connections for moving the valve element to its two positions, and speed responsive means for controlling the selecting condition of the selecting means.

19. In control means for a change speed gearing having two different speed ratio gear sets, fluid pressure operated means for establishing the two speed gears comprising a control valve means having an element movable to two operative positions, a member for moving the valve element, a source of fluid pressure to exert a force for operating said speed establishing means, selecting means for determining to which position the valve element will be moved by its moving member, and speed responsive means for controlling the selecting condition of the selecting means.

20. In control means for a change speed gearing having two different speed ratio gear sets, fluid pressure operated means for establishing the two speed gears comprising a control valve means having an element rotatable to two operative positions, a member for moving the valve element, a source of fluid pressure to exert a force for operating said speed establishing means, a double arm lever connected to the valve element with the arms extending on opposite sides of its axis, means for selectively connecting the aforesaid member to either arm of the lever, and speed responsive means for controlling the selecting condition of the selective means.

GLENN T. RANDOL.

REFERENCES CITED

The following references are of record in the file of this patent:

UNITED STATES PATENTS

| Number | Name | Date |
|---|---|---|
| 1,729,173 | Marfaing | Sept. 24, 1929 |
| 1,791,502 | Hoy | Feb. 10, 1931 |
| 2,109,615 | Durham | Mar. 1, 1938 |
| 2,138,065 | Layman | Nov. 29, 1938 |
| 2,160,385 | Kraemer et al. | May 30, 1939 |
| 2,169,216 | Boxsom | Aug. 15, 1939 |
| 2,177,662 | Kliesrath et al. | Oct. 31, 1939 |
| 2,185,730 | Griswold | Jan. 2, 1940 |
| 2,218,136 | Price | Oct. 15, 1940 |
| 2,239,182 | Werder | Apr. 22, 1941 |
| 2,240,621 | Johns | May 6, 1941 |
| 2,351,067 | Randol | June 13, 1944 |

FOREIGN PATENTS

| Number | Country | Date |
|---|---|---|
| 507,460 | Great Britain | June 15, 1939 |
| 538,697 | France | Mar. 22, 1922 |